(12) United States Patent
Georgiou et al.

(10) Patent No.: US 7,477,644 B2
(45) Date of Patent: Jan. 13, 2009

(54) METHOD AND SYSTEM OF EFFICIENT PACKET REORDERING

(75) Inventors: Christos J Georgiou, Scarsdale, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 10/604,557

(22) Filed: Jul. 30, 2003

(65) Prior Publication Data

US 2005/0025152 A1    Feb. 3, 2005

(51) Int. Cl.
*H04L 12/28* (2006.01)
*H04L 12/56* (2006.01)

(52) U.S. Cl. .................. 370/394; 370/392; 370/471; 370/474; 370/476; 370/230; 370/231; 370/235; 370/237

(58) Field of Classification Search .................. 370/394
See application file for complete search history.

(56) References Cited

U.S. PATENT DOCUMENTS

| | | | |
|---|---|---|---|
| 5,337,313 A * | 8/1994 | Buchholz et al. | 370/394 |
| 6,246,684 B1 | 6/2001 | Chapman et al. | 370/394 |
| 6,381,242 B1 * | 4/2002 | Maher et al. | 370/394 |
| 6,781,992 B1 * | 8/2004 | Rana et al. | 370/394 |
| 6,895,011 B1 * | 5/2005 | Lassers | 370/394 |
| 7,243,184 B1 * | 7/2007 | Ferguson et al. | 711/100 |
| 2002/0095512 A1 | 7/2002 | Rana et al. | 709/232 |
| 2003/0108066 A1 * | 6/2003 | Trippe | 370/474 |

FOREIGN PATENT DOCUMENTS

| EP | 1180880 A1 | 2/2002 |
|---|---|---|
| EP | 1180880 A1 * | 2/2002 |

* cited by examiner

*Primary Examiner*—Chi H Pham
*Assistant Examiner*—Raj K Jain
(74) *Attorney, Agent, or Firm*—Richard M. Kotulak; Greenblum & Bernstein P.L.C.

(57) ABSTRACT

A method and system is provided to efficiently order packets received over a network. The method detects breaks in sequences for one or more packet flows by detecting out-of-sequence packets and enters the segment of sequential packets into a separate memory area, such as a linked list, for a particular flow. A transmission queue and reorder table is used to record the beginning sequence number for each segment. The transmission queue is consulted to locate the segment beginning with the lowest packet sequence number for a flow. The packets associated with the segment are transmitted in order. The transmission queue is then repeatedly searched for the next lowest packet sequence number for transmission of the associated packet chain until the transmission queue is emptied.

21 Claims, 7 Drawing Sheets

METHOD AND SYSTEM OF EFFICIENT PACKET REORDERING

BACKGROUND OF INVENTION

1. Field of the Invention

The present invention generally relates to the implementation of computer networks, and more particularly, to a method and system for reordering packets received from a high speed data channel.

2. Background Description

In a network system, a network handler receives packets from a high-speed network, performs routing actions and then passes the processed packet to an output port for delivery to its intended destination. Packet processing is performed in accordance with one or more specific network protocols. When packets are received out of order, some protocols and classes of service, for example, Fibre Channel Class 2, require delivery of packets in proper sequence. The protocol handler provides a mechanism to establish the proper order of packets and to deliver them in the sequential order.

A straightforward technique for reordering packets is to use a packet table. For each packet received a table entry is generated containing the "sequence count" and the address pointing to the memory area where the packet resides. The sequence count specifies the sequential position of the packet within its flow. Once all packets from the flow are received packets are sorted by sequence count. This approach is inefficient in terms of both memory usage, because of a possibly large number of packets in a flow, and processing time required for searching and sorting the entries. In addition, sorting is only possible when all packets have been received, requiring possibly high buffering resources.

Another approach is to use a reorder table with depth "n". Similar to the approach described above, for each received packet there is created an entry in the reorder table containing the sequence count and memory address of the packet. The table contains "n" records of the "n" most recently received packets. Once the table is full, the packet with the lowest sequence count is selected for transmission. This entry is removed making space for the next incoming packet. This approach does not guarantee that packets will always be reordered in that packet reordering is possible only if packets are not displaced for more positions than "n" entries in the table. For example, for table size 8, and for packets with sequence count starting at 20 and up received immediately after the packet with sequence count 10 (received packet sequence is "9, 10, 20, 21, 22, 23, 24, 25, 26, 27, 11 . . . "), packets cannot be properly ordered and delivered in sequence.

In yet another approach, a table entry is recorded only if the packet is received out of sequence. In addition to the sequence count of the last frame received in sequence and memory address of the first packet in that sequence, the table entry contains also the length of data received in order, i.e., the sum of data of all packets from that sub-sequence. For example, for packet sequence "10, 20, 21, 22, 23, 11", for the sub-sequence 20 to 23, an entry is created containing the sequence count of the last packet in the sub-sequence (23), the address pointing to the first packet in the sub-sequence (20), and the length of all data contained in packets 20 to 23.

Proper order of packets is determined by searching for the table entry with the lowest sequence count and accessing the data of given length from the given memory location. This approach requires large contiguous memory area to store all packets received in sequence, which can be significant. In addition, packets from various flows are received intermixed, so for each flow a separate memory area has to be provided to store all packets received in sequence for that flow. As it is not known in advance how many packets are in a flow and how many packets are in sequence, this technique leads to extremely inefficient memory utilization.

SUMMARY OF INVENTION

In an aspect of the invention, a method is provided for reordering data packets received out of order comprising the steps of reading context information from a received data packet to determine if it is in a given sequence, comparing said context information to an expected sequence count for the given sequence, and if there is a match storing the received packet with said context information in a memory as a linked list, wherein all packets are in order. The method further provides for creating a new linked list each time a packet is received out-of-order and linking all subsequent packets received in order, constructing a reorder table of addresses of the first packet for all linked lists and reading packets out of the memory in an order specified by the reorder table.

In another aspect of the invention, a method for ordering packets is provided comprising the steps of detecting at least one of an in-sequence and an out-of-sequence packet chain in one or more flows, storing at least one of the in-sequence and the out-of-sequence packet chain in a memory, and providing a sequence number with each of the stored in-sequence and the out-of-sequence packet chain. Further provided are the steps of associating the sequence number with an address in the memory of at least one of the stored in-sequence and the out-of-sequence packet chain, and ordering the at least one of the in-sequence and the out-of-sequence packet chain from the memory based on the associated sequence number to provide one or more packet flows all in-sequence.

In another aspect of the invention, a computer program product is provided comprising a computer usable medium having readable program code embodied in the medium and includes a first computer program code to detect at least one of an in-sequence and an out-of-sequence packet chain in one or more packet flows, a second computer program code to store the detected at least one of the in-sequence and the out-of-sequence packet chain in a memory, a third computer program code to provide a sequence number with each of the stored in-sequence and the out-of-sequence packet chain. Further provided are a fourth program code to associate the sequence number with an address in the memory of at least one of the stored in-sequence and the out-of-sequence packet chain and a fifth program code to order the at least one of the in-sequence and the out-of-sequence packet chain from the memory based on the associated sequence number to provide one or more packet flows all in-sequence.

BRIEF DESCRIPTION OF DRAWINGS

The foregoing and other objects, aspects and advantages will be better understood from the following detailed description of embodiments of the invention with reference to the drawings, in which.

DETAILED DESCRIPTION

This invention is directed to providing a method of reordering packets received across a network in which some packets may arrive out of sequential order. Packet chains that are received out-of-order are linked into one or more separate lists (e.g., a linked-list). When subsequent processing of the received packets takes place, e.g., retransmitting the received packets, the out-of-order packet chains are dynamically inserted into correct sequence. This method may be used to track and reorder packets from multiple incoming flows so that proper order results for each respective flow when packets are retransmitted (or alternatively, processed in a similar manner). The method of the invention provides for efficient memory utilization and efficient processing during packet processing.

According to an embodiment of the invention, for every flow, context control areas and linked-list structures are maintained for in-sequence packets and out-of-sequence packets. In addition, the packets received out of sequence are recorded in a reorder table, which is a list of all out-of-order packet segments including the sequence count of each packet and the starting address of each segment. All packets from a single flow received in order are stored in memory as a linked list. In an embodiment, a linked list is used to store the pointer to the next packet in the sequence together with the packet data and packet status information. The last packet in the sequence terminates the linked list by placing this pointer to null, or some other terminator value.

The sequence count of each received packet is checked against an expected sequence count for that flow. The expected sequence count is typically the sequence count of the previously received packet incremented by one. Thus, an entry in the reorder table is made for each packet whose sequence count does not match the expected sequence count, and for the first packet received in a flow.

Figure 1:
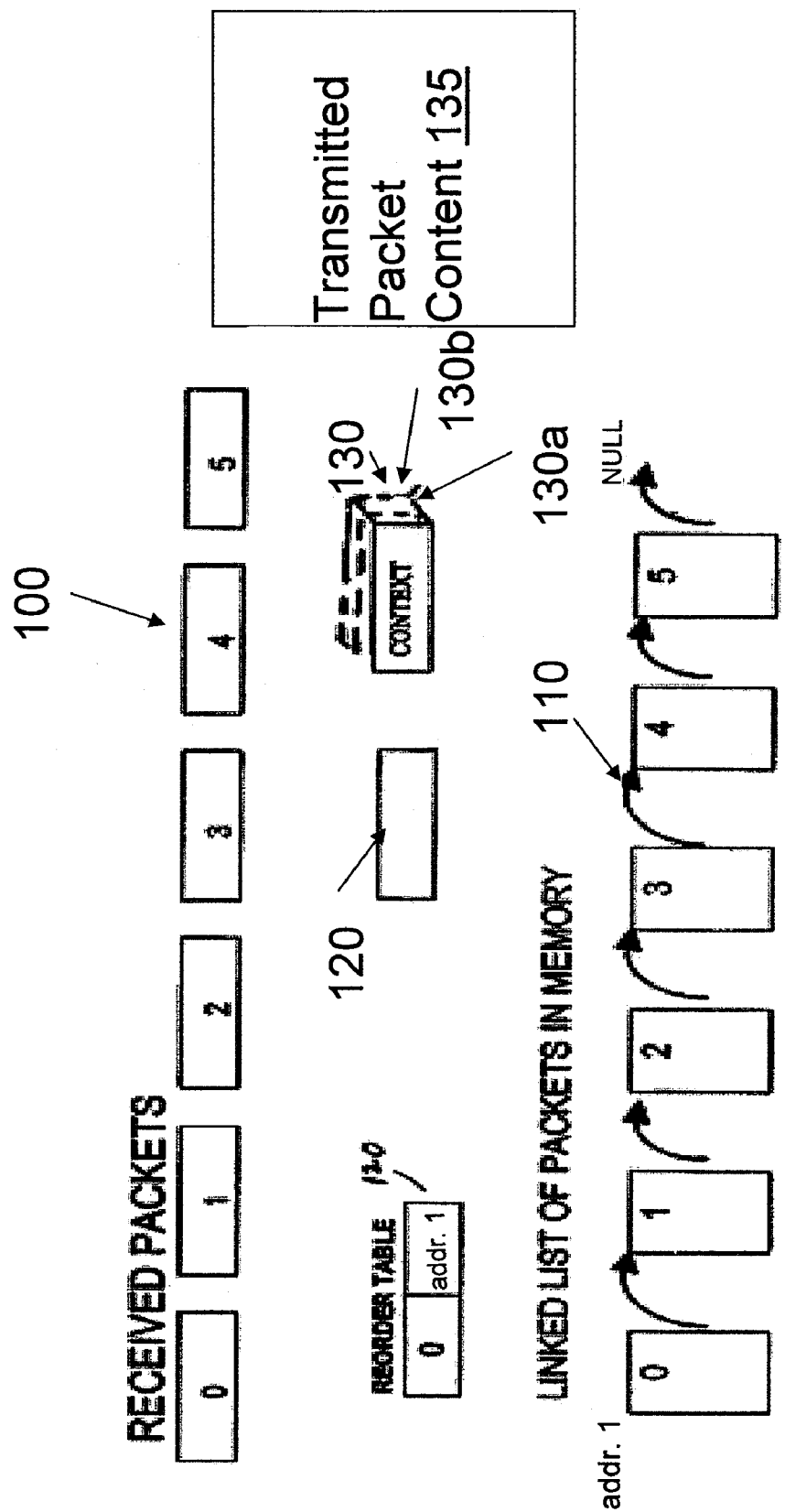
FIG. 1 is an illustrative diagram showing an embodiment of a received packet flow received in-order, according to the invention.

FIG. 1 is an illustrative diagram showing an embodiment of a received packet flow received in-order, generally denoted as reference numeral 100, and a corresponding in-order linked list 110 where the packets are stored pending further processing and/or retransmission. The numeral in each packet of the packet flow (e.g., 0-5) represents a packet sequence number, typically provided by a transmitting entity and may include a timestamp. For situations when a packet flow is received entirely in-order, a reorder table 120 has only one entry reflecting that packet 0 (i.e., the first received packet) and may be found at address location 1 (or other appropriate location). Each subsequent packet, i.e., 1, 2, etc., is linked in order in the linked-list 110 and terminated with a null (or equivalent).

An expected sequence count 125, at least one per flow, is maintained to track the next expected sequence number (or alternatively, in embodiments, it may also track the last sequence number received). A context control area 130 is also maintained to manage context swaps when switching between protocol flows and includes context blocks (e.g., 130a or 130b, etc.) for each flow and maintains information associated with every flow, such as, for example, the location of the reorder tables (e.g., 120, etc.) and associated link-list locations (e.g., 110, etc.). In embodiments, the expected sequence count 125 and transmitted packet count 135 may be included as part of the context control area 130, one for every expected flow.

Figure 2:
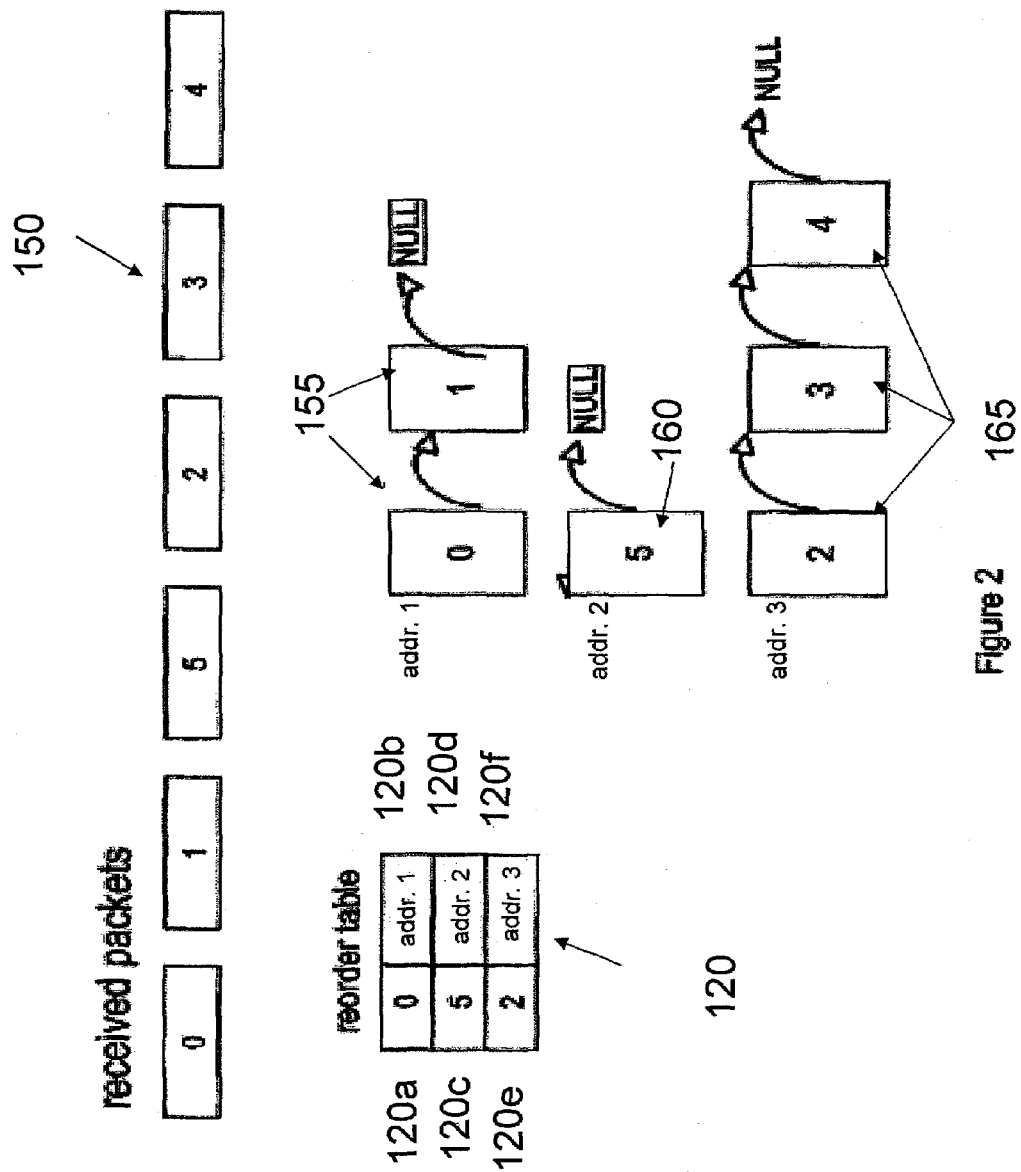
FIG. 2 is an illustrative diagram showing an embodiment of a received packet flow received out-of-order, according to the invention.

FIG. 2 is an illustrative diagram showing an embodiment of a received packet flow received out-of-order, generally denoted as 150. This exemplary out-of-order packet flow sequence is shown as 0, 1, 5, 2, 3, 4. In addition to the first received packet, the reorder table records those segments of packets (i.e., packet chains, where a chain includes one or more packets in order and may be just one packet) that are out-of-order from the last previously received packet. By way of example, as packets are received, the first packet with sequence number "0" is entered into the reorder table 120 at location 120a with the address of the associated packet address "addr1", 120b. The address, "addr.1", 120b, is the beginning of the linked-list, generally shown as 155, containing received in-sequence segment of packets 0 and 1.

Similarly, the next out-of-sequence packet is shown as 120c containing packet sequence 5 and can be found at memory location "addr.2", 120d, with the corresponding linked-list, creating a single packet chain, shown as reference numeral 160. Since the next packet following packet 5 is packet 2, packet 2 is considered out-of-sequence. Packet 2 is entered into the reorder table at 120e with "addr.3", 120f. Since the packets 3 and 4 follow in order after packet 2, they are linked into the linked-list following packet 2 creating a three deep packet chain, as shown generally as 165. Any further out-of-order segments may also have entries in the reorder table 120 and have associated linked-list chains similar to 165. Typically, every flow has an associated reorder table 120, expected sequence count 125, transmitted packet count 135, and associated linked-lists (e.g., 155, 160, 165, etc.). As sequences are entered into a reorder table, e.g., 120, an entry is also made into a transmission queue (also know as a transmit queue) such as 230 (FIG. 3).

Figure 3:
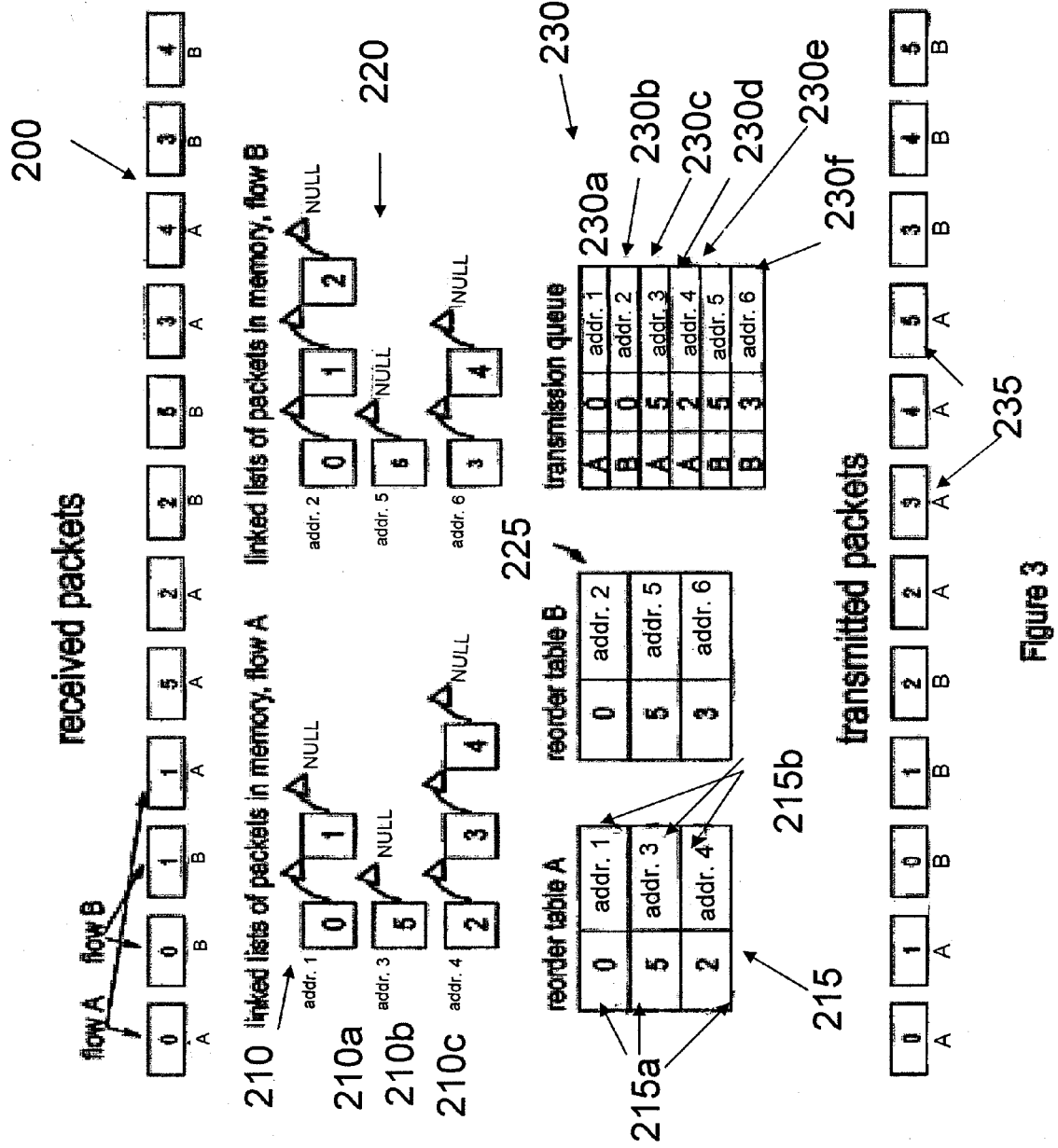
FIG. 3 is illustrative diagram of an embodiment of the invention showing representative component structures for reordering a plurality of packet flows, according to the invention.

FIG. 3 is an illustrative diagram of an embodiment of the invention showing representative component structures for reordering a plurality of packet flows, generally shown as reference numeral 200. Packets from two flows, A and B, are received intermixed and portions being out-of-order. Packets associated with flow A are labeled "A", packets associated with flow B are labeled "B". For each of the flows, packet sequence breaks are detected and recorded into the corresponding reorder table, e.g., 215 or 225, and packets are stored in the memory as linked lists, e.g., 210 or 220. For the example of FIG. 3, six linked lists are used as there are six distinct out-of-order packet segments, three each from two flows, A and B. Any number of out-of-sequence segments may occur for a flow. Included in this diagram is a resulting transmitted packet stream, generally shown as reference numeral 235, with packets in order for both flows A and B produced as a result of using this invention. A relative sequencing relationship is maintained in the transmitted packet stream 235 between the two packet flows A and B, related to the original arrival order of out-of-sequence packets.

FIGS. 4A-6 are flow diagrams showing steps of using the invention. FIGS. 4A-6 may equally represent a high-level block diagram of components of the invention implementing the steps thereof. The steps of FIGS. 4-6 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Figure 4A:
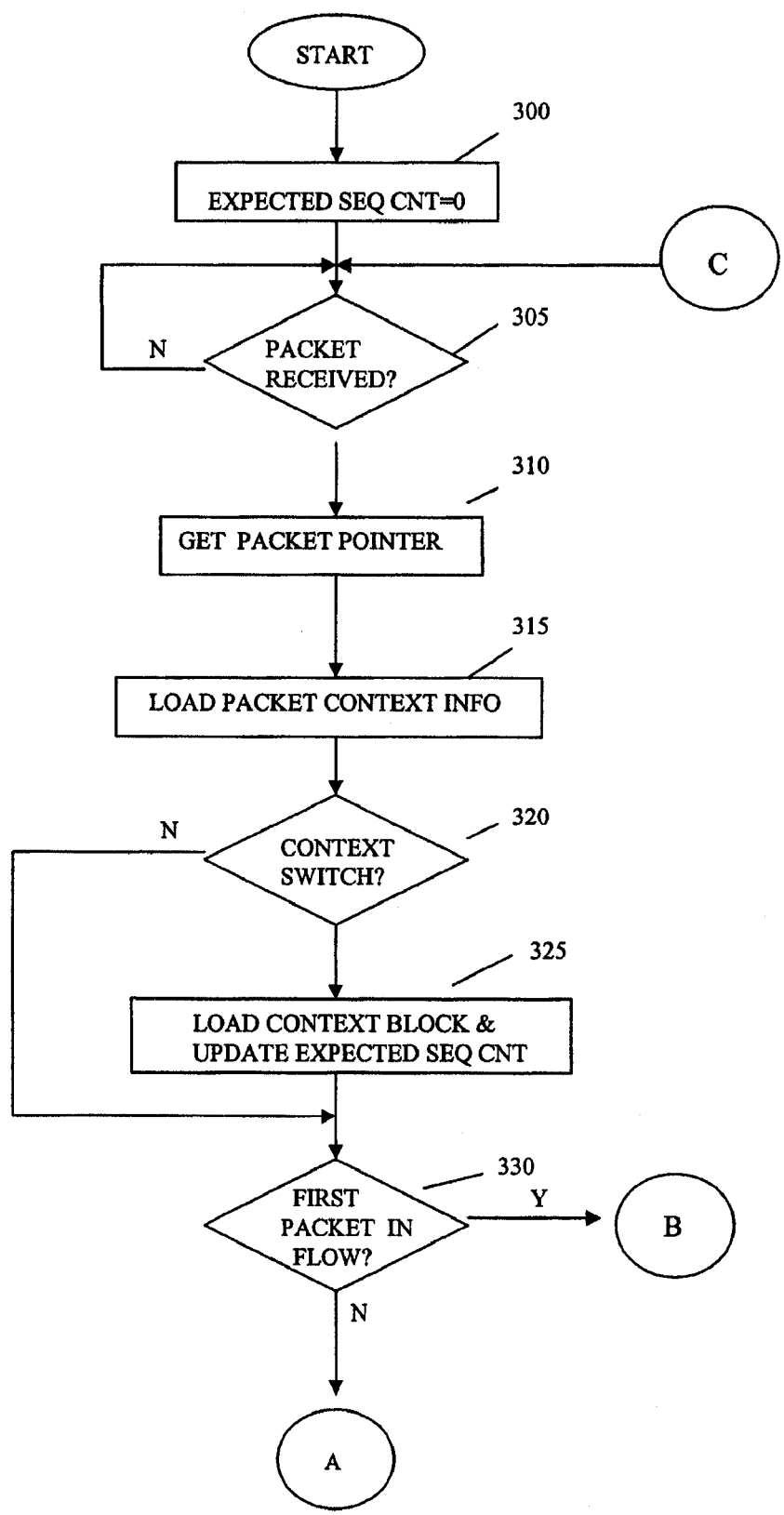
FIGS. 4A-4B are flow charts showing steps of using the invention for receiving packets that may be out of order in one or more flows, according to the invention.
Figure 4B:
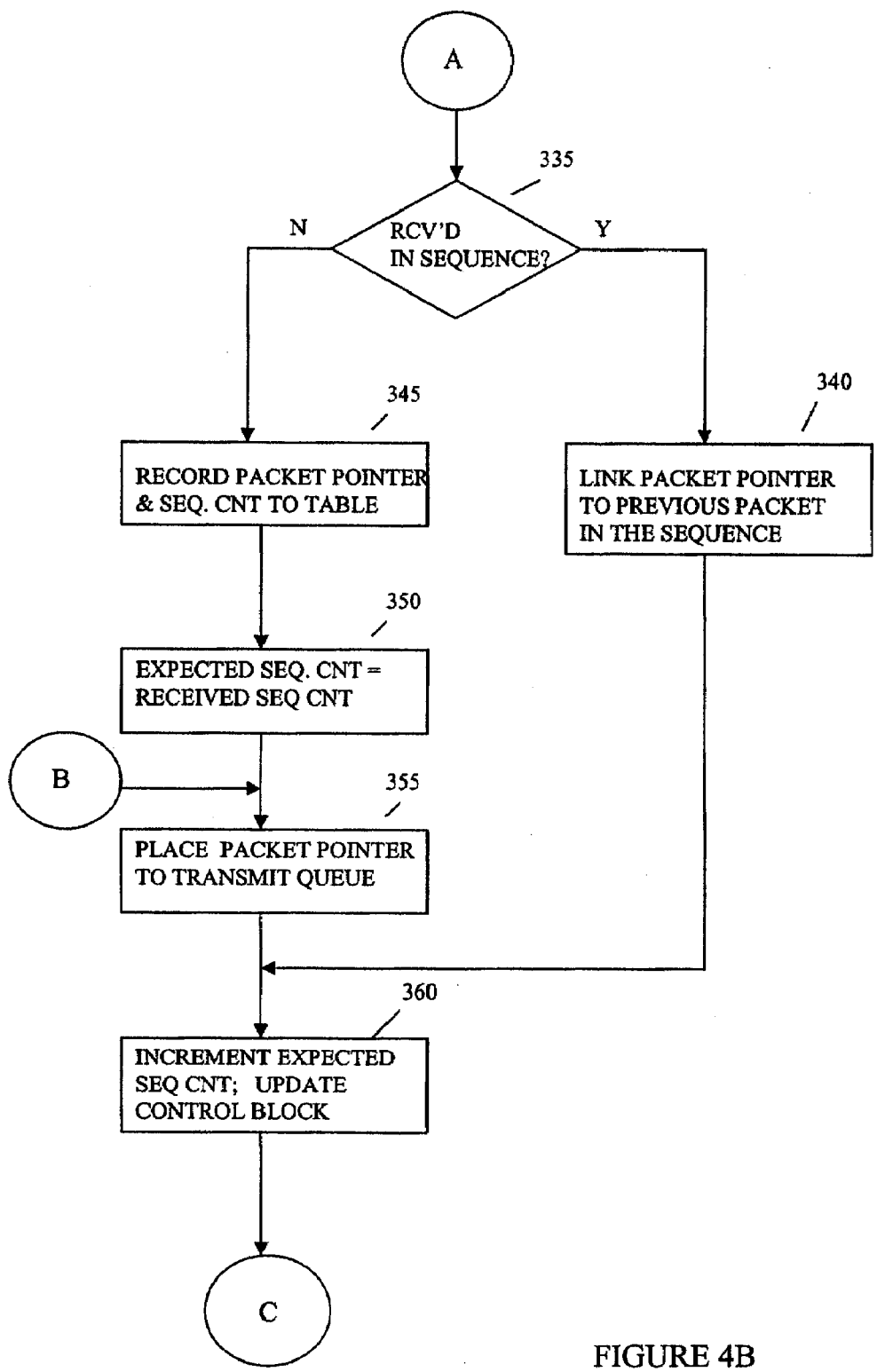

FIGS. 4A and 4B are flow charts showing steps of using the invention for receiving packets that may be out of order in one or more flows (e.g., 200), starting at 300 where an expected sequence count is initialized to zero (or other beginning expected sequence count). At step 305, a check is made whether a packet has been received, and if not, continual checks are made until one is received. The step 310 may be omitted if the following steps are performed during the time when the received packet resides in the receiving local buffering. At step 310, a received packet is stored into a memory location, often by performing a direct memory access (DMA) transfer to an assigned memory area, by using a pointer to the memory area where the packet is to be stored. At step 315, the header of the packet, which contains information (i.e., packet context) about flow, sequence, and connection, is loaded. This information may also be obtained from a part of the packet payload, depending on the protocol involved.

At step 320, the context information is checked against the previously received packet. If the context of the received packet is not the same as the context of the preceding packet, at step 325, the correct context information is loaded from the context control area 130 and the expected sequence count 125 is updated accordingly (i.e., a context swap is performed). The context information is stored in a context status and control block (e.g., 130a or 130b), typically, one context control block per packet flow. If the context information is the same at step 320, processing continues at step 330.

At step 330, a check is made to see if the received packet is the first in a flow. If it is the first in a flow, processing continues at step 355. If not the first in a flow, then at step 335, the sequence count of the received packet is then compared to the expected sequence count 125 for the flow. If these are equal, the packet is received "in order", and at step 340, the packet is linked to the previously received packet forming a linked list packet chain (e.g., 210a or 210c, etc.). Processing continues at step 360. If, however, at step 335, the packet is received out-of-order, then at step 345, a new entry is recorded in the reorder table (e.g., 210a, 210b, or 210c). The entry contains the received sequence count (e.g., 215a, etc.) and the pointer (e.g., 215b, etc.) to the memory area where the packet is stored. At step 350, the expected sequence number 125 is updated to the received packet sequence number, and continues at step 355. At step 355, an entry is made into the transmission queue 230 to register a new chain of packets with a flow indicator (e.g., A or B), a beginning sequence number and an associated memory address, respectively. In embodiments, the relative positioning of elements in any of these tables may be in any practical order. At step 360, the expected sequence count is incremented and the context block 130a or 130b information is updated accordingly. The process continues when a new packet is received at 305 or stops when the network device (or equivalent) is reset or powered off.

Figure 5:
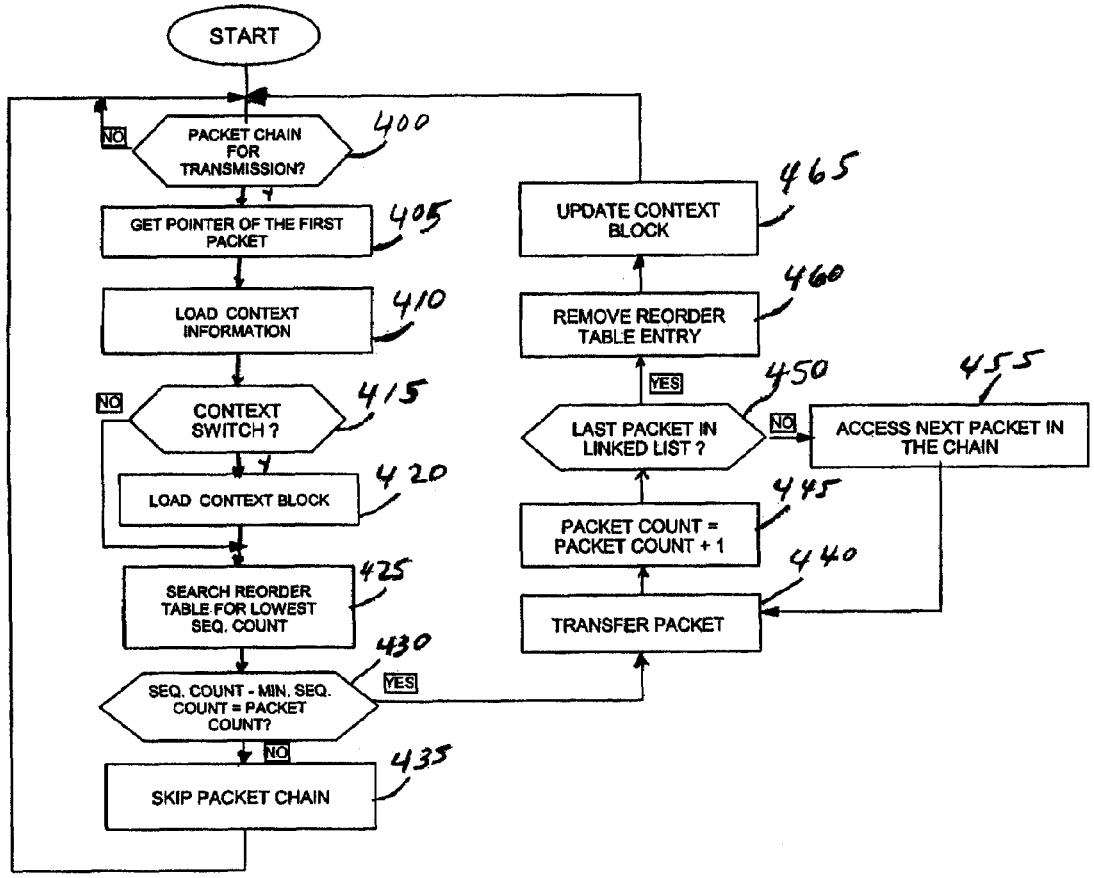
FIG. 5 is a flow diagram showing steps of using the invention for ordering packets for transmission, according to the invention.

FIG. 5 is a flow diagram showing steps of using the invention for ordering packets for transmission, starting at step 400, and using the example of FIG. 3.

After reception of a packet flow, and construction of the various structures (e.g., 210, 215, 220, 225, 230, etc), packets from a flow are subsequently delivered in order to a host or to some other destination according to the invention. To re-order packets for guaranteeing proper sequencing, at step 400, the transmission queue 230 is checked for the first packet chain waiting for transmission. This transmission queue 230 may be built by the steps of FIGS. 4A and 4B. Packets are subsequently chained together, in order, based upon this transmission queue 230 to create a resulting one or more packet chains, e.g., 235. According to the example of FIG. 3, the transmission queue 230 has six entries, 230a-230f, and each entry includes a chain indicator (e.g., "A", or "B"), a sequence count of the beginning packet of the chain, and an address for the first packet in the chain, respectively.

If there is a packet chain waiting, processing continues with step 405, otherwise checks are continued to be made for a packet chain waiting for transmission. At step 405, a next entry (or first entry if a first access) from the transmission table 230 is accessed and the flow context information is accessed by using the context block (e.g., 130a or 130b) associated with the flow indicator (e.g., A) to determine where the first packet of the packet chain is stored (for the first packet chain, this may be entry 230a of the transmission queue).

At step 410, the context information of this packet is checked. A check is made at step 415 to determine whether the context of the flow to which this packet belongs is the same as the previous packet chain and whether a context switch is required. If a context switch is required, at step 420, the proper context information is loaded. Processing continues at step 425 where using the associated context block for the flow (e.g., 130a or 130b), the reorder table (e.g., 215 or 225) belonging to this flow is searched for the lowest sequence count (e.g., 215a). At step 425, the lowest sequence count from the reorder table (e.g., 215 or 225) is checked if this is the next packet which is to be sent. At step 430, this condition is determined by calculating the number of packets from that flow already sent. The number of sent packets from a flow is a difference between the lowest sequence count from the reorder table and the minimal sequence count of that flow (this is recorded in the context block). If this packet chain is not the next to be sent, it is skipped at step 435, and the queue of packet chains waiting for transmission is checked for the next entry.

If this is the next packet chain to be transmitted (at step 430), then at step 440, all packets from the linked list (e.g., chains 210a, 210b, 210c, or a chain from 220, etc.) are accessed and transferred. At step 445, the number of packets sent (i.e., the transmitted packet count 135, for this flow) is incremented. At step 450, a check is made whether the last packet in the linked list (e.g. 210a, 21b, or 210c) has been processed. If not, at step 455, the next packet in the chain is accessed and processing continues with step 440.

If all the packets in the chain are processed from the linked list, the entry in the reorder table (e.g., 215 or 225), and from the transmission queue 230, belonging to this chain are removed. At step 465, the context block is updated to reflect this transaction. Processing continues at step 400.

Further applying the steps of FIG. 5 to the example of FIG. 3, generally, all entries of the transmission queue are processed in turn. The next entry (230b) in the transmission queue in this example has a sequence count 0 of the flow B at the address 2. As this is the first packet from the flow B, all three packets from this chain are sent. The context block belonging to the flow B is updated to record 3 sent packets and the entry (230b) in the reorder table B is removed.

The next entry (i.e., 230c) in the transmission queue in this example is the sequence count 5 of the flow A. The reorder table for flow A (i.e., 215) is searched for the lowest sequence count, which is by this iteration, sequence count 2. Thus, the packet chain from flow A starting with sequence count 5 is skipped, and the next entry from the transmission queue is checked. In this example, the next entry (230d) in the transmission queue is the sequence count 2 of the flow A at the address 4. As this is the next packet to be sent from the flow A, all three packets from this chain are sent. The context block (e.g., 130a) belonging to the flow A is updated to record a total of 5 sent packets and the entry (2, addr. 4) in the reorder table A (215) is removed. This process repeats for the remaining entries (i.e., 230e and 230f) until all packets from the transmission queue 230 are sent. All packets from flows A and B are transmitted in order, but the flows are intermixed with a relative relationship to the order of segments received.

Figure 6:
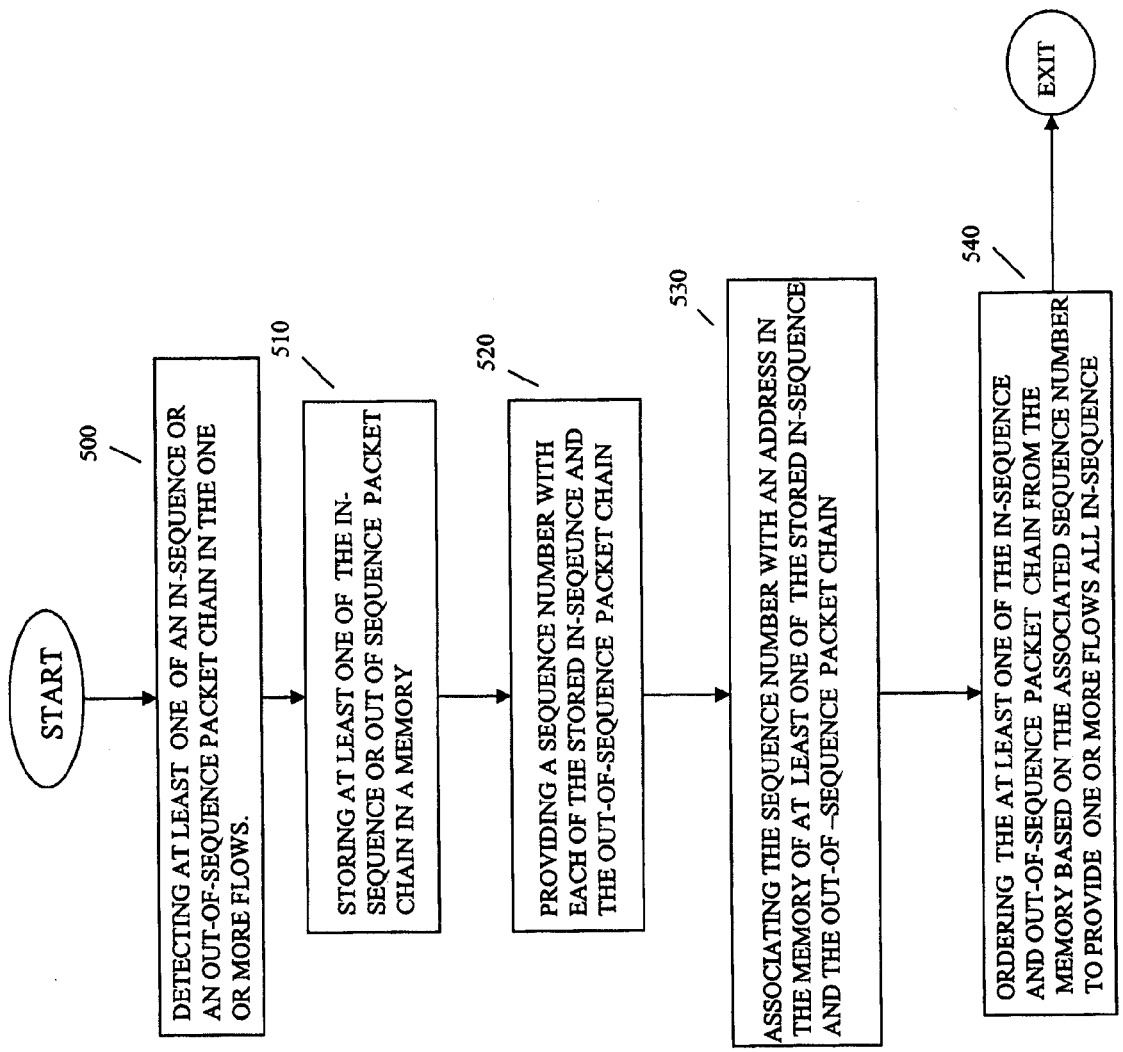
FIG. 6 is a flow diagram showing steps of an embodiment of using the invention.

FIG. 6 is a flow diagram showing the steps of using the invention in an embodiment, beginning at step 500, where at least one of an in-sequence or an out-of-sequence packet chain in the one or more flows. At step 510, storing at least one of the in-sequence or out of sequence packet chain in a memory is done. At step 520, a sequence number is provided with each of the stored in-sequence and out-of-sequence packet chains. At step 530, the sequence number is associated with an address in the memory of at least one of the stored in sequence or out-of-sequence packet chain. At step 540, the at least one of the in-sequence and out-of sequence packet chain are retrieved and ordered from the memory based on the associated sequence number to provide one or more flows having all in-sequence packets.

This invention also may be implemented as a multiprocessor or multithreaded implementation. For a multiprocessor/multithread environment, in an embodiment, multiple flows are processed on different processors, and all packet chains are queued for transmission to an outbound line. Processing packets from the same flow on several processors can bring packets out of order due to different processing latencies associated to each packet. The invention guarantees transmission of all packets from all flows in order. For multiprocessor environments, at transmission, data may be sorted by searching the reorder table depending on the flow identification and sequence counts of each particular flow. Only packets in a particular flow should be properly sorted, not the packets between various flows.

This invention may use one or more pre-allocated fixed sized buffers for storing received packets. This allows for simple memory management, eliminating the need for complex and time consuming dynamic memory management tasks, like garbage collection. This results in a more efficient memory management system. No assumptions are made concerning the size of the buffers, allowing for implementation of multiple sized buffers, or independent linked lists of small and large buffers for storing appropriately sized packets (e.g., small or large packets for flows A and B, respectively). The disclosed invention is applicable to all these variations of embodiments.

The invention eliminates the need to pre-allocate significant contiguous memory area for each flow received and for each sub sequence of packets received in order. As it is not known in advance how many packets are contained in a single flow and how many of those are going to be received in order, the invention provides for efficient memory utilization and processing overhead.

Additionally, the invention may use the reorder table of relatively small size, as only points of breaks in the flow sequence are recorded. This results in short processing time and low memory requirements.

While the invention has been described in terms of embodiments, those skilled in the art will recognize that the invention can be practiced with modifications and in the spirit and scope of the appended claims.

The invention claimed is:

1. A method of reordering data packets received out of order, the method comprising the steps of: reading context information from a received data packet to determine whether the received packet is in a given sequence; comparing said context information of the received data packet to an expected sequence count for the given sequence, and storing the received packet with said context information in a memory as a linked list when there is a match, all received packets in the linked list being in order; creating a new linked list each time a new data packet is received out-of-order; linking in order all subsequent packets received in order to the new linked list; constructing a reorder table of addresses of a first packet for all linked lists; and reading packets out of the memory in an order specified by the reorder table.

2. The method of claim 1, wherein the comparing step includes incrementing the expected sequence count.

3. The method of claim 1, wherein comparing context information includes comparing a flow type indicator.

4. The method of claim 1, further comprising the step of constructing a transmission table of one or more entries, each entry including at least one of a flow indicator, a sequence number and a memory address associated any of the linked lists, the flow indicator being associated with the reorder table.

5. The method of claim 4, wherein:
the constructing a reorder table includes one or more entries, each entry having a sequence number of the first packet of one linked list;
the reading packets step includes the steps of: accessing the one or more transmission table entries in turn, and for each entry, using the flow indicator to locate the associated reorder table;
searching the associated reorder table to locate any entry having the sequence number matching the accessed transmission table entry's sequence number; and
reading all packets in order from a linked list associated with the located any entry.

6. The method of claim 5, wherein the constructing a reorder table step includes constructing one or more reorder tables, each of the one or more reorder table associated with one or more packet flows.

7. The method of claim 5, wherein the accessing the one or more transmission table entries, in turn, provides a relative ordering among all the read data packets between one or more packet flows.

8. The method of claim 1, wherein all subsequent packets are linked based on a sent order.

9. A method for ordering packets, the method comprising the steps of: detecting at least one of an in-sequence and an out-of-sequence packet chain in one or more packet flows; storing the detected at least one of the in-sequence and the out-of-sequence packet chain in a memory; providing a sequence number with each of the stored in-sequence and the out-of-sequence packet chain; associating the sequence number with an address in the memory of at least one of the stored in-sequence and the out-of-sequence packet chain; ordering the at least one of the in-sequence and the out-of-sequence packet chain from the memory based on the associated sequence number to provide one or more packet flows all in-sequence; creating a new linked list each time a new data packet of the packet chain is received out-of-sequence linking in order all subsequent packets received in sequence to the new linked list; constructing a reorder table of addresses of a first packet for all linked lists; and reading packets out of the memory in an order specified by the reorder table.

10. The method of claim 9, wherein the detecting step includes the steps of:
initializing an expected sequence count for each of the one or more packet flows;

comparing a received sequence count to the expected sequence count for the packet flow associated with a currently received packet;

setting the expected sequence count for the packet flow associated with the currently received packet to the received sequence count when unequal; and incrementing the expected sequence count for the packet flow associated with the currently received packet.

11. The method of claim 9, wherein the storing step includes linking one or more received packets into a linked list associated with the sequence number of each of the at least one in-sequence and the out-of-sequence packet chain.

12. The method of claim 9, wherein the sequence number is a list of sequence numbers, each associated with at least one of the in-sequence and the out-of-sequence packet chain.

13. The method of claim 9, wherein the associating step includes the steps of:

determining if a context switch is necessary by checking a packet context information in a received packet; and switching context when the packet context information has changed for a next received packet, the packet context information including flow context information.

14. The method of claim 9, wherein the associating step further includes entering an entry so that a temporal order of the at least one of the in-sequence and the out-of-sequence packet chain is maintained.

15. The method of claim 9, further including building a table by entering the sequence number of a first packet of any of the packet chains and an address in the memory of the stored at least one of the in-sequence and the out-of-sequence packet chain of the any of the packet chains.

16. The method of claim 9, wherein the ordering step includes the steps of:

accessing a transmission table to retrieve a next non-null entry;

searching a reorder table based on the next non-null transmission table entry to locate a reorder table entry with a lowest sequence number and at least equal to or less than the sequence number in the next non-null transmission table entry;

transmitting all packets in the at least one of the in-sequence and the out-of-sequence packet chain identified in the located reorder table entry so that the packets are sent in sequence order, and incrementing a transmitted packet count for each transmitted packet; and removing the located reorder entry.

17. The method of claim 16, further including the step of returning to the transmission table to access another next non-null entry.

18. The method of claim 16, wherein the reorder table and the transmitted packet count are associated with one of the one or more packet flows.

19. The method of claim 16, wherein the searching a reorder step includes searching the reorder table based on the next non-null transmission table entry to locate the reorder table entry with the sequence number next to be sent as indicated by the transmitted packet count.

20. The method of claim 9, wherein the ordering step includes:

retrieving an entry from a transmission table associated with one or more reorder tables;

identifying locations of the in-sequence and out-of-sequence packet chains;

searching the associated one or more reorder tables for the sequence number associated with one of the in-sequence and out-of-sequence corresponding to the retrieved entry;

determining whether the sequence number associated with the one of in-sequence and out-of-sequence packet chain is a minimal sequence number;

if so, then transmit in order the packet chain associated with the minimal sequence number; and if not the minimal sequence number, then search the reorder table for next minimal sequence number and transmit in order the packet chain associated with next minimal sequence number and continue search and transmitting next minimal sequence number and associated packet chain until the retrieved minimal sequence number and associated packet chain has been transmitted.

21. A computer program product comprising a computer usable medium having readable program code embodied in the medium to perform a method operable to: detect at least one of an in-sequence and an out-of-sequence packet chain in one or more packet flows; store the detected at least one of the in-sequence and the out-of-sequence packet chain in a memory; provide a sequence number with each of the stored in-sequence and the out-of-sequence packet chain; associate the sequence number with an address in the memory of at least one of the stored in-sequence and the out-of-sequence packet chain; order the at least one of the in-sequence and the out-of-sequence packet chain from the memory based on the associated sequence number to provide one or more packet flows all in-sequence; create a new linked list each time a new data packet of the packet chain is received out-of-sequence; link in order all subsequent packets received in sequence to the new linked list; construct a reorder table of addresses of a first packet for all linked lists; and read packets out of the memory in an order specified by the reorder table.

* * * * *